United States Patent
Lim et al.

(10) Patent No.: US 9,111,424 B2
(45) Date of Patent: Aug. 18, 2015

(54) THREE DIMENSIONAL (3D) TACTILE FEEDBACK APPARATUS AND METHOD

(71) Applicant: SAMSUNG ELECTRONICS CO., LTD., Suwon-si, Gyeonggi-do (KR)

(72) Inventors: Soo Chul Lim, Seoul (KR); Hyung Kew Lee, Gunpo-si (KR); Joon Ah Park, Seoul (KR); Bho Ram Lee, Seongnam-si (KR); Hyun Jeong Lee, Hwaseong-si (KR); Seung Ju Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 13/746,943

(22) Filed: Jan. 22, 2013

(65) Prior Publication Data

US 2014/0002249 A1   Jan. 2, 2014

(30) Foreign Application Priority Data

Jun. 27, 2012  (KR) .................. 10-2012-0069314

(51) Int. Cl.
*H04B 3/36* (2006.01)
*G08B 6/00* (2006.01)
*G06F 3/01* (2006.01)

(52) U.S. Cl.
CPC . *G08B 6/00* (2013.01); *G06F 3/016* (2013.01)

(58) Field of Classification Search
None
See application file for complete search history.

(56) References Cited

U.S. PATENT DOCUMENTS

| | | | | |
|---|---|---|---|---|
| 4,795,296 | A | * | 1/1989 | Jau ..................................... 414/5 |
| 6,118,435 | A | * | 9/2000 | Fujita et al. ................... 345/173 |
| 6,163,739 | A | * | 12/2000 | Park et al. ..................... 700/245 |
| 6,320,487 | B1 | * | 11/2001 | Miller et al. .................. 335/274 |
| 6,373,465 | B2 | * | 4/2002 | Jolly et al. .................... 345/156 |
| 2001/0000663 | A1 | * | 5/2001 | Shahoian et al. ............. 345/156 |
| 2006/0238505 | A1 | * | 10/2006 | Ahlgren et al. ............... 345/161 |
| 2008/0246735 | A1 | * | 10/2008 | Reynolds et al. ............. 345/173 |
| 2009/0040175 | A1 | * | 2/2009 | Xu et al. ....................... 345/156 |
| 2010/0097198 | A1 | * | 4/2010 | Suzuki ........................ 340/407.2 |
| 2010/0141411 | A1 | * | 6/2010 | Ahn et al. .................. 340/407.2 |
| 2010/0265176 | A1 | * | 10/2010 | Olsson et al. ................. 345/161 |
| 2011/0025455 | A1 | * | 2/2011 | Whalen et al. ................. 340/4.1 |
| 2012/0249315 | A1 | * | 10/2012 | Vanhelle et al. ........... 340/425.5 |

FOREIGN PATENT DOCUMENTS

| | | | |
|---|---|---|---|
| EP | 1227027 A2 | * 7/2002 | ............... B62D 6/00 |
| JP | 2008-264535 | 11/2008 | |
| JP | 2009-066163 | 4/2009 | |
| JP | 2011-025023 | 2/2011 | |
| JP | 2011-189128 | 9/2011 | |
| JP | 10-2011-0129260 | 12/2011 | |
| JP | 2012-040384 | 3/2012 | |

* cited by examiner

*Primary Examiner* — Julie Lieu
(74) *Attorney, Agent, or Firm* — NSIP Law

(57) ABSTRACT

A three-dimensional (3D) tactile feedback apparatus and method for implementing the same may include a tactile feedback providing unit which provides a 3D tactile feedback, in response to a motion input by a user, a position measuring unit which measures a position of the tactile feedback providing unit, and a movement controlling unit which controls a movement of the tactile feedback providing unit based on the position of the tactile feedback providing unit.

26 Claims, 7 Drawing Sheets

THREE DIMENSIONAL (3D) TACTILE FEEDBACK APPARATUS AND METHOD

CROSS-REFERENCE TO RELATED APPLICATIONS

This application claims the priority benefit of Korean Patent Application No. 10-2012-0069314, filed on Jun. 27, 2012, in the Korean Intellectual Property Office, the disclosure of which is incorporated herein by reference.

BACKGROUND

1. Field

Example embodiments relate to a three-dimensional (3D) tactile feedback apparatus and method, and more particularly, to an apparatus and method that may provide a user with an accurate magnitude of a 3D tactile feedback.

2. Description of the Related Art

A 3D tactile feedback apparatus may transfer, to a user, a direction, a magnitude, and a texture of a force.

The 3D tactile feedback apparatus may include a haptic feedback technology by which an artificial sensation may be generated and transferred to a user so that the user may experience a sensation similar to the user operating a robot or an object directly in reality when instead the robot is being controlled remotely or virtually by the user or the object is controlled intuitively by the user in a virtual space.

A haptic feedback may be provided by a scheme of adjusting a degree of a load to be felt when the user operates an instrument, in a case in which the user controls a distant robot or an object in a virtual space using the instrument.

The more similar a sensation felt by the user is when controlling a corresponding object in reality or the more similar a sensation felt by the user is when controlling a robot or the corresponding object in a virtual space, the more effective the haptic feedback may be. Accordingly, as the 3D tactile feedback apparatus provides the user with a tactile feedback with higher accuracy, the effectiveness of the haptic feedback may increase.

SUMMARY

The foregoing and/or other aspects are achieved by providing a three-dimensional (3D) tactile feedback apparatus, including a tactile feedback providing unit to provide a 3D tactile feedback in response to a motion input by a user, a position measuring unit to measure a position of the tactile feedback providing unit, and a movement controlling unit to control a movement of the tactile feedback providing unit, based on the position of the tactile feedback providing unit.

The movement controlling unit may control the movement of the tactile feedback providing unit independently in an X-axial direction and in a Y-axial direction. Here, the X-axial direction and the Y-axial direction may constitute a horizontal direction.

The position measuring unit may measure a horizontal position of the tactile feedback providing unit, by sensing the tactile feedback providing unit using at least one sensor disposed to be adjacent to a bottom surface of the tactile feedback providing unit.

The position measuring unit may measure a horizontal position of the tactile feedback providing unit, using a sensor connected to a side surface of the tactile feedback providing unit and at least one sensor connected to an inner side surface of the movement controlling unit.

The movement controlling unit may include a first moving unit to move the tactile feedback providing unit in an X-axial direction, and a second moving unit to move the first moving unit in a Y-axial direction.

The position measuring unit may receive the position of the tactile feedback providing unit from a first sensor connected to the first moving unit, and may determine the received position of the tactile feedback providing unit to be an X-axial coordinate of the tactile feedback providing unit.

The position measuring unit may receive a position of the first moving unit from a second sensor connected to the second moving unit, and may determine the received position of the first moving unit to be a Y-axial coordinate of the tactile feedback providing unit.

The movement controlling unit may determine a position to which the tactile feedback providing unit is to be moved, based on the motion input by the user, and may control the movement of the tactile feedback providing unit to move the tactile feedback providing unit to the determined position.

The movement controlling unit may control the tactile feedback providing unit in a Z-axial direction corresponding to a vertical direction when a horizontal movement of the tactile feedback providing unit is determined.

The tactile feedback providing unit may change a shape of a portion in contact with the user, depending on types of tactile feedback to be provided to the user.

In accordance with another aspect, a 3D tactile feedback apparatus may include a tactile feedback providing unit to provide a 3D tactile feedback in response to a motion input by a user, a movement controlling unit to control a movement of the tactile feedback providing unit, based on a position of the tactile feedback providing unit, at least one first sensor connected to a surface of the tactile feedback providing unit, and at least one second sensor connected to a surface of the movement controlling unit. At least one of the at least one first sensor and the at least one second sensor may sense an area and position of the other to determine the position of the tactile feedback providing unit.

The at least one first sensor may be connected to a bottom surface of the tactile feedback providing unit and the at least one second sensor may include at least third and fourth sensors connected to a top internal surface of the movement controlling unit. The at least third and fourth sensors may sense different respective areas of the first sensor to determine the position of the tactile feedback providing unit.

The 3D tactile feedback apparatus may further include a position measuring unit to measure a position of the tactile feedback providing unit and at least one actuator connected to a side surface of the movement controlling unit to move the tactile feedback providing unit in a horizontal direction. When the at least one actuator expands in a first horizontal direction, the position measuring unit may measure the position of the tactile feedback providing unit by matching a first side of the tactile feedback providing unit to a first side of the at least one first sensor sensed by the third sensor, and by matching a second side of the tactile feedback providing unit to a second side of the at least one first sensor sensed by the fourth sensor.

The movement controlling unit may include a first moving unit enclosing the tactile feedback providing unit and a second moving unit enclosing the first moving unit, wherein the at least one first sensor may be connected to a side surface of the tactile feedback providing unit, the at least one second sensor may be connected to an internal side surface of the first moving unit, and the at least one second sensor may sense the first sensor and set a position of the first sensor to a position of the tactile feedback providing unit. A third sensor may be connected to an internal side of the second moving unit and a fourth sensor may be connected to an external side surface of the first moving unit, wherein the third sensor may sense the fourth sensor and set a position of the fourth sensor to a position of the first moving unit.

The foregoing and/or other aspects are achieved by providing a 3D tactile feedback apparatus method, including measuring a position of a tactile feedback providing unit that provides a 3D tactile feedback in response to a motion input by a user, and controlling a movement of the tactile feedback providing unit, based on the position of the tactile feedback providing unit.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
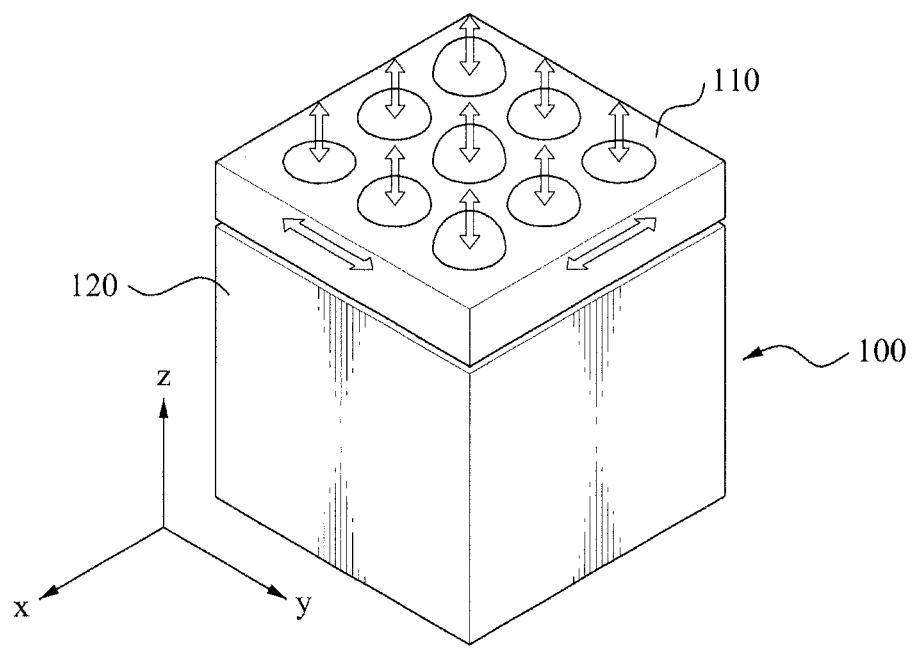
FIG. 1 is a perspective view illustrating a three-dimensional (3D) tactile feedback apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 is a perspective view illustrating a three-dimensional (3D) tactile feedback apparatus 100 according to example embodiments.

Referring to FIG. 1, the 3D tactile feedback apparatus may include a tactile feedback providing unit 110 to provide a tactile feedback to a user, and a movement controlling unit 120 to control a movement of the tactile feedback providing unit 110.

The 3D tactile feedback apparatus may provide the tactile feedback to the user, by moving the tactile feedback providing unit 110 in contact with the user in an X-axial direction and a Y-axial direction constituting a horizontal direction, and moving the tactile feedback providing unit 110 in a Z-axial direction corresponding to a vertical direction, through the movement controlling unit 120, in response to a motion input by the user. That is, the tactile feedback providing unit 110 may be moved in forward or backward directions in an X-axial direction, and/or in forward or backward directions in a Y-axial direction. Additionally, or alternatively, the tactile feedback providing unit 110 may be moved in upward or downward directions in a Z-axial direction. For example, when the user inputs a motion of controlling a robot or an instrument into a control device, the control device may operate the robot or the instrument based on the motion input by the user. In this instance, a feedback device may identify a motion of the robot or a motion of the instrument, and may determine a tactile feedback to be provided to the user, based on the identified motion of the robot or the identified motion of the instrument. The 3D tactile feedback apparatus 100 may provide the tactile feedback determined by the feedback device to the user.

In this instance, the 3D tactile feedback apparatus 100 may measure a position of the tactile feedback providing unit 110, and may control the tactile feedback providing unit 110 based on the measured position of the tactile feedback providing unit 110. Accordingly, a discrepancy between a position of a tactile feedback desired to be provided to the user and an actual position of a tactile feedback to be provided to the user may be prevented.

In addition, when the measured position of the tactile feedback providing unit 110 is different from the position of the tactile feedback desired to be provided to the user, the 3D tactile feedback apparatus 100 may correct the position of the tactile feedback providing unit 110 based on the position of the tactile feedback desired to be provided to the user, thereby providing an accurate tactile feedback to the user.

Figure 2:
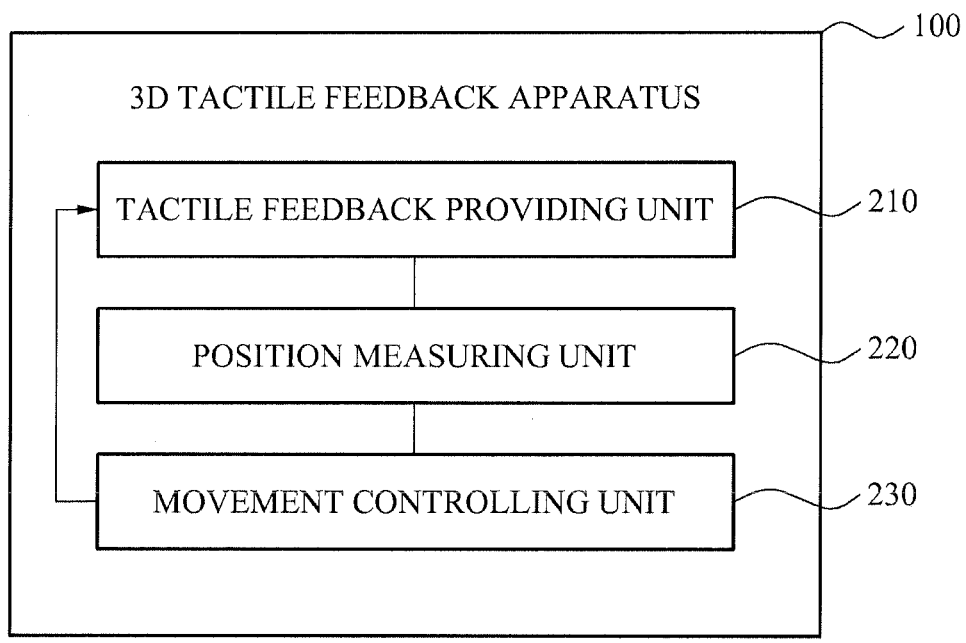
FIG. 2 is a block diagram illustrating a structure of a 3D tactile feedback apparatus according to example embodiments.

FIG. 2 is a block diagram illustrating a structure of a 3D tactile feedback apparatus 100 according to example embodiments.

Referring to FIG. 2, the 3D tactile feedback apparatus 100 may include a tactile feedback providing unit 210, a position measuring unit 220, and a movement controlling unit 230.

The tactile feedback providing unit 210 may provide a 3D tactile feedback in response to a motion input by a user.

In particular, the tactile feedback providing unit 210 may be in contact with the user to provide the 3D tactile feedback to the user. In this instance, a direction and a magnitude of the 3D tactile feedback to be provided to the user by the tactile feedback providing unit 210 may be determined by at least one of the movement controlling unit 230, a control device that controls a robot or an instrument based on the motion input by the user, and a feedback device that provides a feedback to the user based on a motion of the robot or a motion of the instrument.

In addition, the tactile feedback providing unit 210 may change a shape of a portion in contact with the user, depending on a type of tactile feedback desired to be provided to the user. For example, a top surface of the tactile feedback providing unit 210 may include projections which change shape.

An operation of the tactile feedback providing unit 210 changing the shape of the portion in contact with the user will be described in detail with reference to FIG. 6.

The position measuring unit 220 may measure a position of the tactile feedback providing unit 210. In this instance, the position measuring unit 220 may measure a horizontal position of the tactile feedback providing unit 210, using a capacitive sensor, an image sensor and light source, a magnetic sensor, a linear encoder, an optical linear encoder, and the like.

As an example, the position measuring unit 220 may measure the horizontal position of the tactile feedback providing unit 210, by sensing the tactile feedback providing unit 210 using at least one sensor disposed to be adjacent to the tactile feedback providing unit 210. For example, a sensor may be connected to a side surface most adjacent to the movement controlling unit 230, among side surfaces of the tactile feedback providing unit and be out of contact with a driving device to be used by the movement controlling unit 230 to move the tactile feedback providing unit 210. In addition, a plurality of sensors that sense the tactile feedback providing unit 210 may be connected to a side surface of the movement controlling unit 230 that is closest to the side surface of the tactile feedback providing unit 210 to which the sensor is connected. For example, when the tactile feedback providing unit 210 is connected to an upper portion of the movement controlling unit 230 provided in a box shape, the plurality of sensors that senses the tactile feedback providing unit 210 may be connected to a top surface, among inner surfaces corresponding to a box-shaped internal portion of the movement controlling unit 230.

In this instance, the position measuring unit 220 may measure the horizontal position of the tactile feedback providing unit 210, based on a position of a sensor sensing the tactile feedback providing unit 210, among the at least one sensor.

In addition, when a plurality of sensors, among the at least one sensor, senses the tactile feedback providing unit 210, the position measuring unit 220 may measure the horizontal position of the tactile feedback providing unit 210, based on an area of the tactile feedback providing unit 210 sensed by each of the plurality of sensors.

Example embodiments in which the position measuring unit 220 may measure the horizontal position of the tactile feedback providing unit 210 using at least one sensor disposed to be adjacent to a bottom surface of the tactile feedback providing unit 210 will be described in detail with reference to FIGS. 3 and 4. In this instance, the bottom surface of the tactile feedback providing unit 210 may refer to an external bottom surface of the tactile feedback providing unit 210, and may correspond to a surface closest to the movement controlling unit 230.

As another example, the position measuring unit 220 may measure the horizontal position of the tactile feedback providing unit 210, using a sensor connected to a side surface of the tactile feedback providing unit 210, and at least one sensor connected to an inner side surface of the movement controlling unit 230.

Example embodiments in which the position measuring unit 220 may measure the horizontal position of the tactile feedback providing unit 210 using the at least one sensor disposed to be adjacent to a side surface of the tactile feedback providing unit 210 will be described in detail with reference to FIG. 5.

The movement controlling unit 230 may control a movement of the tactile feedback providing unit 210, based on the position of the tactile feedback providing unit 210 measured by the position measuring unit 220. In this instance, the movement controlling unit 230 may control a horizontal movement of the tactile feedback providing unit 210, using at least one of a pneumatic actuator, an ultrasonic motor, a small linear direct current (DC) motor, a piezo-type actuator, and an electroactive polymer.

In this instance, the movement controlling unit 230 may control the movement of the tactile feedback providing unit 210 independently in an X-axial direction and in a Y-axial direction. Here, movement in the X-axial direction and the Y-axial direction may constitute movement in a horizontal direction. That is, the movement controlling unit 230 may move the tactile feedback providing unit 210 in the X-axial direction, in the Y-axial direction, or in a diagonal direction based on both the X-axial direction and the Y-axial direction.

Figure 5:
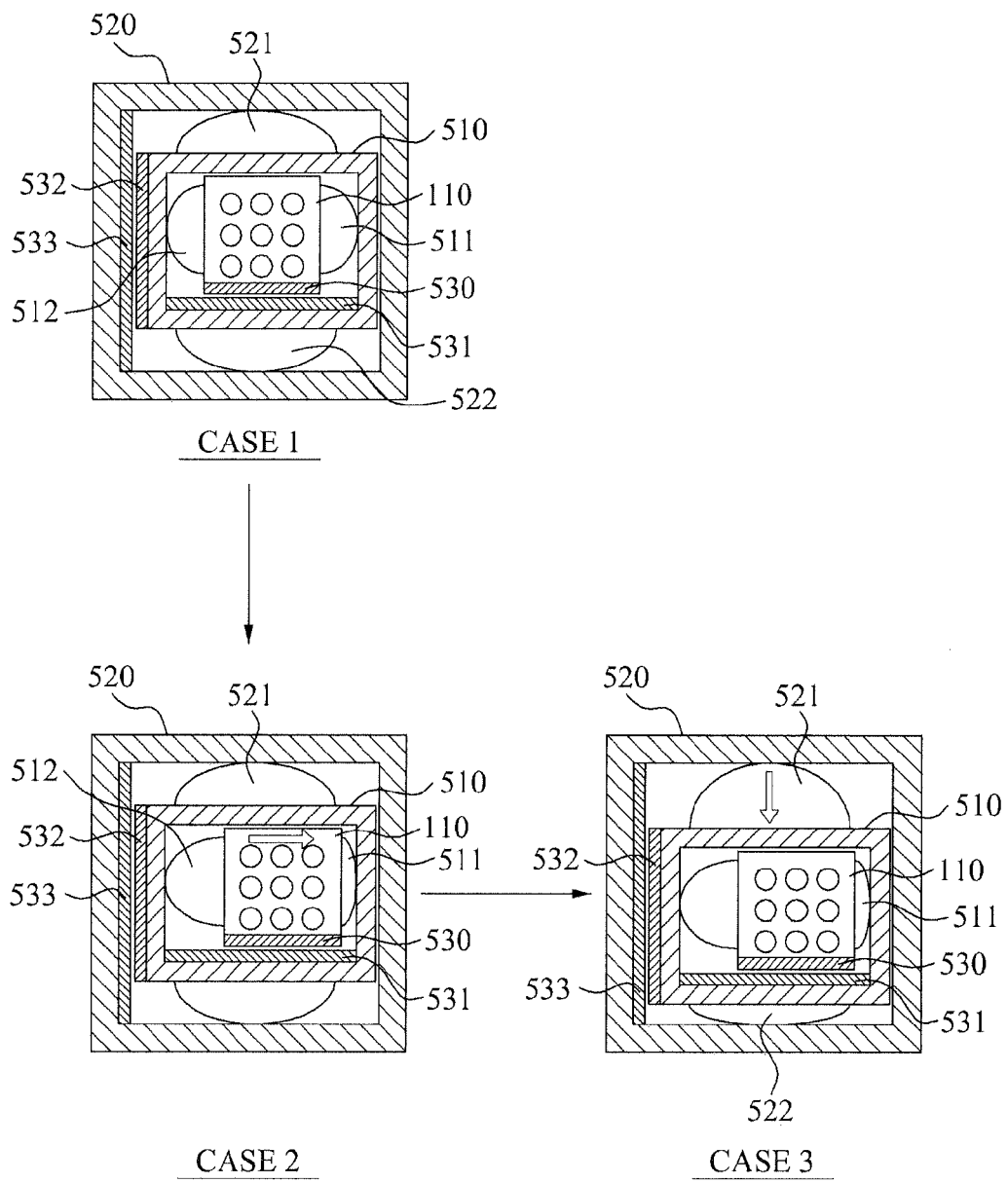
FIG. 5 is a top view illustrating an operation of a 3D tactile feedback apparatus according to other example embodiments.

In addition, the movement controlling unit 230 may include a first moving unit to move the tactile feedback providing unit 210 in the X-axial direction, and a second moving unit to move the first moving unit in the Y-axial direction, as illustrated in FIG. 5.

In this instance, the position measuring unit 220 may receive a position of the tactile feedback providing unit 210 from a first sensor connected to the first moving unit, and may determine the received position of the tactile feedback providing unit 210 to be an X-axial coordinate of the tactile feedback providing unit 210. In addition, the position measuring unit 220 may receive a position of the first moving unit from a second sensor connected to the second moving unit, and may determine the received position of the first moving unit to be a Y-axial coordinate of the tactile feedback providing unit 210.

The movement controlling unit 230 may determine a position to which the tactile feedback providing unit 210 is to be moved, based on the motion input by the user, and may control the movement of the tactile feedback providing unit 210 to move the tactile feedback providing unit 210 to the determined position.

For example, the movement controlling unit 230 may receive a position of the tactile feedback providing unit 210 measured by the position measuring unit 220, at a predetermined time interval or in real time, while moving the tactile feedback providing unit 210 in the determined direction. In this instance, the movement controlling unit 230 may suspend movement of the tactile feedback providing unit 210 when the position of the tactile feedback providing unit 210 is identical to the determined position, thereby moving the tactile feedback providing unit 210 to an accurate position. In addition, the movement controlling unit 230 may correct the position of the tactile feedback providing unit 210 based on the determined position when the tactile feedback providing unit 210 moves farther than the determined position. In particular, the movement controlling unit 230 may move the tactile feedback providing unit 210 until the position of the tactile feedback providing unit 210 is identical to the determined position.

In addition, the movement controlling unit 230 may control the tactile feedback providing unit 210 in a Z-axis direction corresponding to a vertical direction when the horizontal movement of the tactile feedback providing unit 210 is determined. In particular, when the position of the tactile feedback providing unit 210 is identical to the determined position, the movement controlling unit 230 may move the tactile feedback providing unit 210 upward or downward in the vertical direction, thereby providing a tactile feedback to the user.

Figure 3:
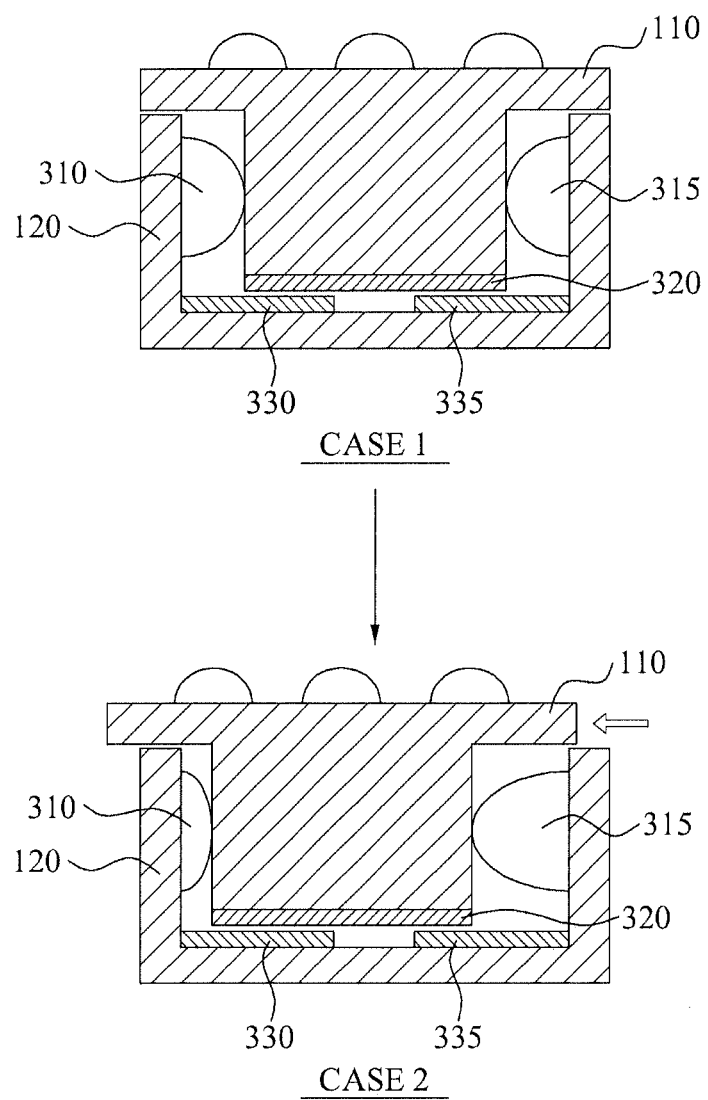
FIG. 3 is a cross-sectional view illustrating an operation of a 3D tactile feedback apparatus according to example embodiments.

FIG. 3 is a cross-sectional view illustrating an operation of a 3D tactile feedback apparatus according to example embodiments.

According to the example embodiments, a movement controlling unit 120 may move a tactile feedback providing unit 110, using a plurality of actuators 310 and 315.

In this instance, the 3D tactile feedback apparatus may measure a position of the tactile feedback providing unit 110, using a first sensor 320 connected to a bottom surface of the tactile feedback providing unit 110, and a second sensor 330 and a third sensor 335 connected to a top surface of the movement controlling unit 120, as shown in Case 1 of FIG. 3. As can be seen from FIG. 3, the second sensor 330 and third sensor 335 may be disposed below the first sensor 320. Further, the movement controlling unit 120, being provided in a box shape, may have inner sides which are connected with an inner bottom surface to be substantially L-shaped, and the second sensor 330 may be disposed on top of the inner bottom surface of the movement controlling unit 120, and may have one end of the second sensor 330 positioned in an inner elbow of the L-shaped inner sides. Likewise, the third sensor 335 may be disposed on top of the inner bottom surface of the movement controlling unit 120, and may have one end of the third sensor 335 positioned in an inner elbow of the L-shaped inner sides which are opposite to the elbow of the one end which the second sensor 330 is positioned. Here, the first sensor 320, the second sensor 330, and the third sensor 335 may correspond to capacitive sensors that sense portions in contact with one another.

For example, when the tactile feedback providing unit 110 is provided at a center, the second sensor 330 and the third sensor 335 may sense identical areas of the first sensor 320. Accordingly, the 3D tactile feedback apparatus may measure the position of the tactile feedback providing unit 110 to be in between the second sensor 330 and the third sensor 335.

As shown in Case 2 of FIG. 3, the movement controlling unit 120 may expand the actuator 315 and contract the actuator 310 to move the tactile feedback providing unit 110 in a left direction. Here, the actuator 310 may be disposed on an inner side portion of the box-shaped movement controlling unit 120, while actuator 315 may be positioned on an opposite inner side portion of the box-shaped movement controlling unit 120. In this instance, an area of the second sensor 330 sensed by the first sensor 320 may be greater than an area of the second sensor 330 sensed by the third sensor 335. Also, an area of the first sensor 320 sensed by the second sensor 330 may be greater than an area of the first sensor 320 sensed by the third sensor 335.

Accordingly, the 3D tactile feedback apparatus may determine that the tactile feedback providing unit 110 is moved in a direction towards the second sensor 330. In this instance, the 3D tactile feedback apparatus may measure an accurate position of the tactile feedback providing unit 110, based on an area and a position of the second sensor 330 sensed by the first sensor 320, or an area and a position of the first sensor 320 sensed by the second sensor 330. In particular, the 3D tactile feedback apparatus may measure the position of the tactile feedback providing unit 110 by matching a left surface of the tactile feedback providing unit 110 to a left end of the first sensor 320 sensed by the second sensor 330, and matching a right surface of the tactile feedback providing unit 110 to a right end of the first sensor 320 sensed by the third sensor 335. While FIG. 3 illustrates measuring movement of the tactile feedback providing unit 110 in the left direction, movement of the tactile feedback providing unit 110 may be measured in other directions. Further, FIG. 3 merely illustrates an example of a cross-sectional view of the 3D tactile feedback apparatus. Accordingly, it should be understood that sensors and actuators may be arranged on other sides and surfaces of the movement controlling unit 120, which are not shown in FIG. 3, and more than two sensors may be disposed on top of the inner bottom surface of the movement controlling unit 120.

Figure 4:
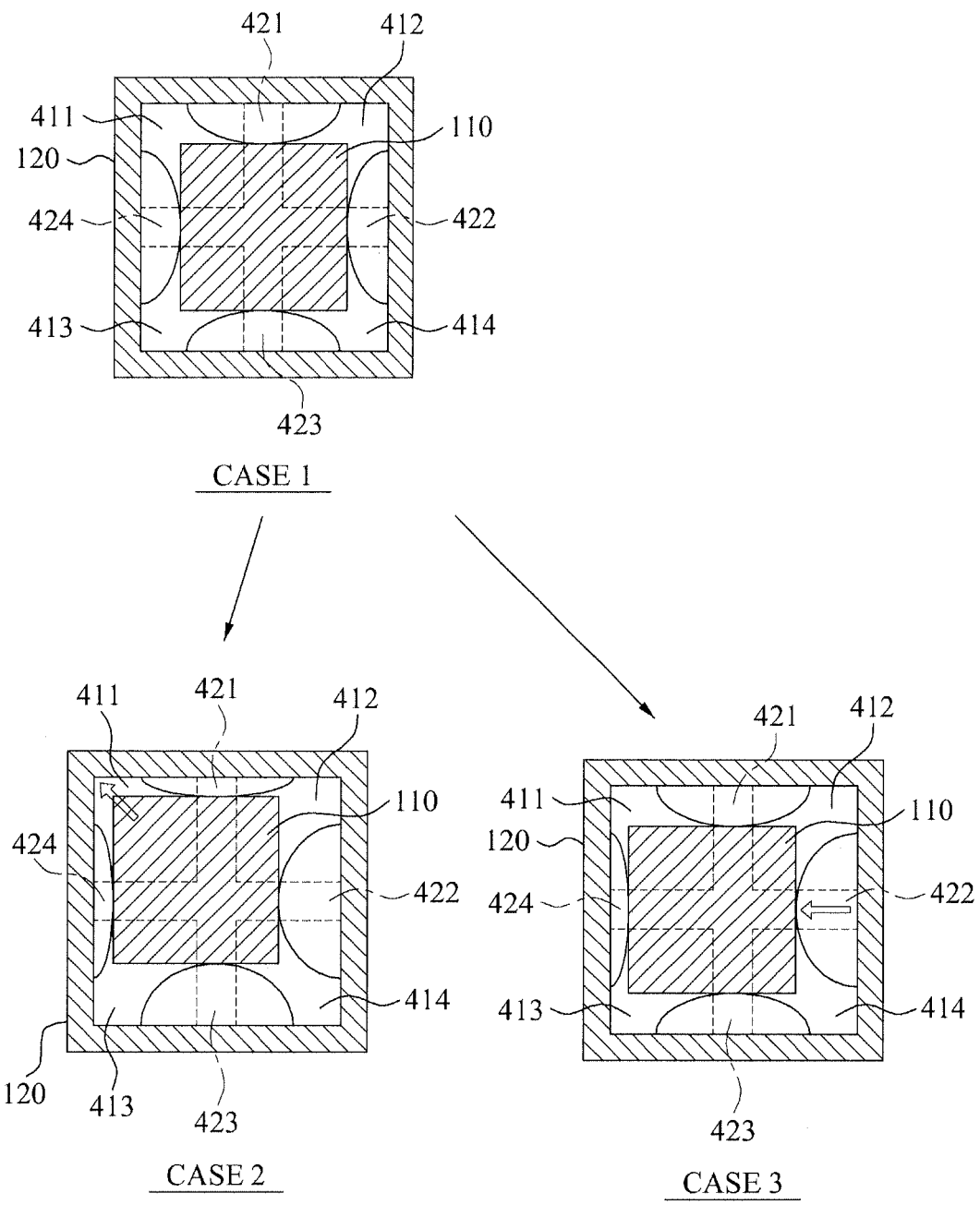
FIG. 4 is a top view illustrating an operation of a 3D tactile feedback apparatus according to example embodiments.

FIG. 4 is a top view illustrating an operation of a 3D tactile feedback apparatus according to example embodiments.

FIG. 4 illustrates a case in which a tactile feedback providing unit 110 of the 3D tactile feedback apparatus moves in a left direction or in a diagonal direction.

In this instance, actuators that move the tactile feedback providing unit 110 of the 3D tactile feedback apparatus may be connected to all side surfaces of the tactile feedback providing unit, as shown in Case 1 of FIG. 4. Accordingly, the 3D tactile feedback apparatus may measure a position of the tactile feedback providing unit 110 using a plurality of sensors connected to a top surface, among inner surfaces corresponding to a box-shaped internal portion of a movement controlling unit 120.

The 3D tactile feedback apparatus may measure the position of the tactile feedback providing unit 110, using a first sensor 411, a second sensor 412, a third sensor 413, and a fourth sensor 414. Here, the first sensor 411, the second sensor 412, the third sensor 413, and the fourth sensor 414 may correspond to capacitive sensors that sense a fifth sensor (not shown) connected to a bottom surface of the tactile feedback providing unit 110.

For example, as shown in Case 1 of FIG. 4, when the tactile feedback providing unit 110 is provided at a center, the first sensor 411, the second sensor 412, the third sensor 413, and the fourth sensor 414 may sense identical areas of the tactile feedback providing unit 110. In addition, the first sensor 411 may sense the tactile feedback providing unit 110 at an upper left end, and the second sensor 412 may sense the tactile feedback providing unit 110 at an upper right end. The third sensor 413 may sense the tactile feedback providing unit 110 at a lower left end, and the fourth sensor 414 may sense the tactile feedback providing unit 110 at a lower right end.

Accordingly, the 3D tactile feedback apparatus may measure the position of the tactile feedback providing unit 110 to be in the middle among the first sensor 141, the second sensor 412, the third sensor 413, and the fourth sensor 414, when the areas of the tactile feedback providing unit 110 which are measured by each of the four sensors are equal or substantially equal to one another.

As shown in Case 2 of FIG. 4, the movement controlling unit 120 may expand a second actuator 422 and a third actuator 423, and contract a first actuator 421 and a fourth actuator 424 to move the tactile feedback providing unit 110 in an upper-left direction. In this instance, an area of the tactile feedback providing unit 110 sensed by the first sensor 411 may be greater than areas of the tactile feedback providing unit 110 sensed by the second sensor 412, the third sensor 413, and the fourth sensor 414, respectively.

Accordingly, the 3D tactile feedback apparatus may determine that the tactile feedback providing unit 110 is moved in an upper-left direction towards the first sensor 411. In this instance, the 3D tactile feedback apparatus may measure an accurate position of the tactile feedback providing unit 110, based on the areas of tactile feedback providing unit 110 sensed by the first sensor 411, the second sensor 412, the third sensor 413, and the fourth sensor 414.

In addition, as shown in Case 3 of FIG. 4, the movement controlling unit 120 may expand the second actuator 422 and contract the fourth actuator 424 while maintaining states of the first actuator 421 and the third actuator 423 to move the tactile feedback providing unit 110 in a left direction. In this instance, areas of the tactile feedback providing unit 110 sensed by the first sensor 411 and the third sensor 413 may be greater than areas of the tactile feedback providing unit 110 sensed by the second sensor 412 and the fourth sensor 414.

Accordingly, the 3D tactile feedback apparatus may determine that the tactile feedback providing unit 110 is moved in a left direction towards the first sensor 411 and the third sensor 413. In this instance, the 3D tactile feedback apparatus may measure an accurate position of the tactile feedback providing unit 110, based on the areas of the tactile feedback providing unit 110 sensed by the first sensor 411, the second sensor 412, the third sensor 413, and the fourth sensor 414.

FIG. 5 is a top view illustrating an operation of a 3D tactile feedback apparatus according to other example embodiments.

According to the example embodiments, a first moving unit 510 to move a tactile feedback providing unit 110 in an X-axial direction, and a second moving unit 520 to move the first moving unit 510 in a Y-axial direction may constitute the movement controlling unit 120 of FIG. 1, as shown in Case 1 of FIG. 5.

In this instance, as shown in Case 2 of FIG. 5, the first moving unit 510 may enable the tactile feedback providing unit 110 to move in an internal portion of the first moving unit in the X-axial direction, using a first actuator 511, and a second actuator 512. The first actuator 511 may be connected to a first side surface of the tactile feedback providing unit 110 and the second actuator 512 may be connected to a second side surface of the tactile feedback providing unit 110, which is opposite to the first side surface.

The 3D tactile feedback apparatus may receive a position of the tactile feedback providing unit 110 from a first sensor 531 connected to the first moving unit 510, and may determine the received position of the tactile feedback providing unit 110 to be an X-axial coordinate of the tactile feedback providing unit 110. In this instance, the first sensor 531 may sense a second sensor 530 connected to a side surface of the tactile feedback providing unit 110, set a position of the sensed second sensor 530 to a position of the tactile feedback providing unit 110, and transmit the set position of the tactile feedback providing unit 110 to the 3D tactile feedback apparatus.

In addition, as shown in Case 3 of FIG. 5, the second moving unit 520 may enable the first moving unit 510 to move in an internal portion of the second moving unit 520 in the Y-axial direction, using a third actuator 521, and a fourth actuator 522. Here, the third actuator 521 may be connected to a first outer side surface of the first moving unit 510 and the fourth actuator 522 may be connected to a second outer side surface of the first moving 510, which is opposite to the first outer side surface. In this instance, the tactile feedback providing unit 110 included in the first moving unit 510 may move along with the first moving unit 510 when the first moving unit 510 moves. One of ordinary skill in the art would understand that movement of the first moving unit 510 in the Y-axial direction may be performed sequentially or simultaneously with movement of the tactile feedback providing unit 110 in the X-axial direction.

The 3D tactile feedback apparatus may receive a position of the first moving unit 510 from a third sensor 533 connected to the second moving unit 520, and may determine the received position of the first moving unit 510 to be a Y-axial coordinate of the tactile feedback providing unit 110. In this instance, the third sensor 533 may sense a fourth sensor 532 connected to an outer side surface of the first moving unit 510, set a position of the sensed fourth sensor 532 to a position of the first moving unit 510, and transmit the set position of the first moving unit 510 to the 3D tactile feedback apparatus.

Hereinafter, an operation of the movement controlling unit 120 moving the tactile feedback providing unit 110 in a lower right direction will be described.

As illustrated in Case 2 of FIG. 5, the movement controlling unit 120 may expand the second actuator 512 and contract the first actuator 511 to move the tactile feedback providing unit 110 in a right direction. In this instance, the first sensor 531 may sense a position of the tactile feedback providing unit having moved in the right direction, and the position measuring unit 220 may determine the position of the tactile feedback providing unit 110 sensed by the first sensor 531 to be an X-axial coordinate of the tactile feedback providing unit 110.

As illustrated in Case 3 of FIG. 5, the movement controlling unit 120 may expand the third actuator 521 and contract the fourth actuator 522 to move the tactile feedback providing unit 110 in a lower direction. In this instance, the third sensor 533 may sense a position of the first moving unit 510 having moved in the lower direction, and the position measuring unit 220 may determine the position of the first moving unit 510 sensed by the third sensor 533 to be a Y-axial coordinate of the tactile feedback providing unit 110.

According to the example embodiments, moving units may operate with respect to different directions of movement, respectively, whereby the tactile feedback providing unit 110 may be controlled independently in an X-axial direction and in a Y-axial direction. For example, as disclosed above, the first moving unit 510 may include the tactile feedback providing unit 110 internally, which may be controlled in an X-axial direction using the first sensor 531 and second sensor 530. Meanwhile, the second moving unit 520 may include the first moving unit 510 internally, which may be controlled in a Y-axial direction using the third sensor 533 and fourth sensor 532, to thereby correspondingly control movement of the tactile feedback providing unit 110 in the Y-axial direction.

Alternatively, a reverse operation of the embodiment described above with respect to FIG. 5 may be performed. For example, moving units may operate with respect to different directions of movement, respectively, whereby the tactile feedback providing unit 110 may be controlled independently in a Y-axial direction and in an X-axial direction. For example, the first moving unit 510 may include the tactile feedback providing unit 110 internally, which may be controlled in a Y-axial direction using the first sensor 531 and second sensor 530. Meanwhile, the second moving unit 520 may include the first moving unit 510 internally, which may be controlled in an X-axial direction using the third sensor 533 and fourth sensor 532, to thereby correspondingly control movement of the tactile feedback providing unit 110 in the X-axial direction.

Figure 6:
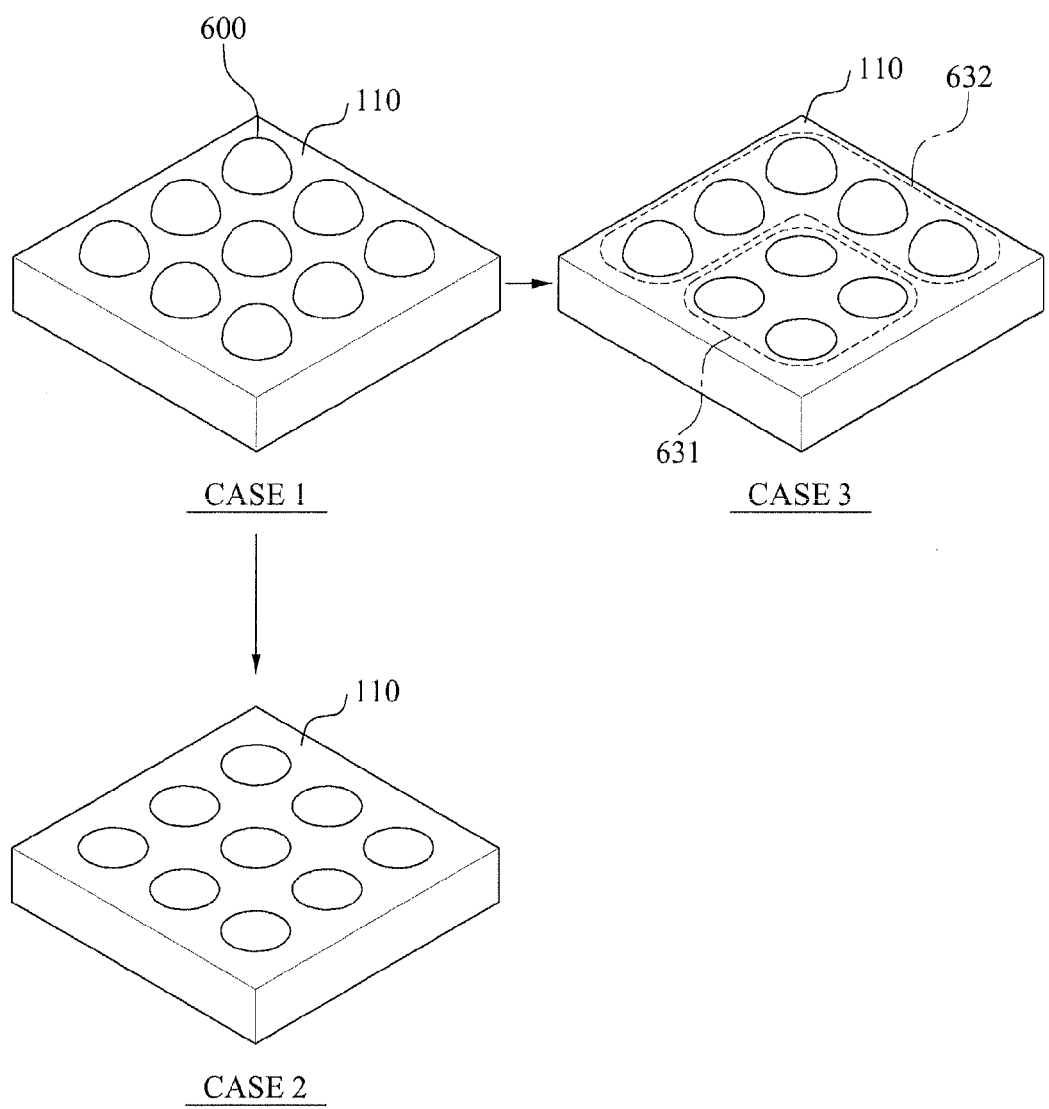
FIG. 6 is a view illustrating an operation of a tactile feedback providing unit according to example embodiments.

FIG. 6 is a view illustrating an operation of a tactile feedback providing unit according to example embodiments.

According to example embodiments, the tactile feedback providing unit may change a shape of a top surface to be in contact with a user, depending on types of tactile feedback to be provided to the user.

Referring to FIG. 6, a top surface of a tactile feedback providing unit 110 to be in contact with a user may include a plurality of projections 600. In this instance, the plurality of projections 600 may be inserted into an external portion of the tactile feedback providing unit 110, and may operate independently of each other.

For example, as illustrated in Case 1 of FIG. 6, when a tactile feedback similar to touching a rough object is desired to be provided to the user, the tactile feedback providing unit 110 may enable all of the plurality of projections 600 to protrude from the tactile feedback providing unit 110, thereby providing a rough tactile feedback to the user.

As illustrated in Case 2 of FIG. 6, when a tactile feedback similar to touching a smooth object is desired to be provided to the user, the tactile feedback providing unit 110 may enable all of the plurality of projections 600 to be inserted into an external portion of the tactile feedback providing unit 110, thereby providing a smooth tactile feedback to the user.

In addition, as illustrated in Case 3 of FIG. 6, the tactile feedback providing unit 110 may enable a portion of the plurality of projections 600 in a partial area 631 to be inserted into the external portion of the tactile feedback providing unit 110, and may enable another portion of the plurality of projections 600 in another area 632 to protrude from the tactile feedback providing unit 110, thereby providing the user with a tactile feedback similar to touching a predetermined shape. For example, the tactile feedback providing unit 110 may enable only a portion of the plurality of projections 600 disposed in an upper part and a right part to protrude from the tactile feedback providing unit 110, thereby providing the user with a tactile feedback similar to touching an inverted "L" shape. The projections 600 may be semi-spherical in shape, as shown in FIG. 6. However, the projections may be shaped in a shape other than a semi-spherical shape (e.g., cubic, pyramidal, cylindrical, etc.).

Figure 7:
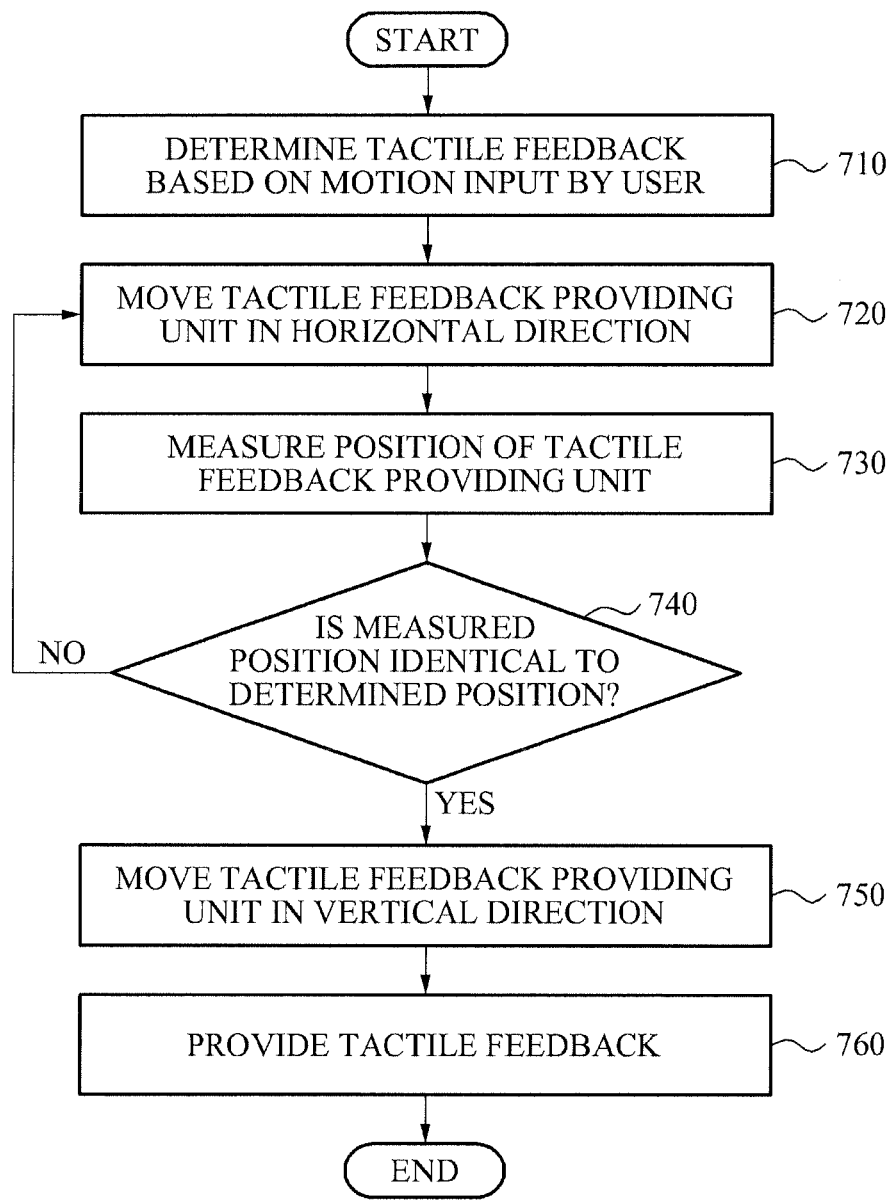
FIG. 7 is a flowchart illustrating a 3D tactile feedback method according to example embodiments.

FIG. 7 is a flowchart illustrating a 3D tactile feedback method according to example embodiments. Here, the 3D tactile feedback method may be performed by the 3D tactile feedback apparatus 100 of FIG. 2.

Referring to FIG. 7, in operation 710, the movement controlling unit 230 may determine a magnitude, a direction, and a shape of a tactile feedback to be provided to a user, based on a motion input by the user. In this instance, the 3D tactile feedback apparatus 100 may receive information related to the magnitude, the direction, and the shape of the tactile feedback to be provided to the user from a control device that controls a robot or an instrument based on the motion input by the user, and a feedback device that provides the user with a feedback based on a motion of the robot or a motion of the instrument.

The movement controlling unit 230 may determine a position to which the tactile feedback providing unit 210 is to be moved, based on the magnitude, the direction, and the shape of the tactile feedback to be provided to the user.

In operation 720, the movement controlling unit 230 may move the tactile feedback providing unit in a horizontal direction, based on the direction of the tactile feedback determined in operation 710. In this instance, the movement controlling unit 230 may apply a force to the tactile feedback providing unit 210 to move the tactile feedback providing unit 210 to the position determined in operation 710. When another force is applied to the tactile feedback providing unit 210, the tactile feedback providing unit 210 may not be moved to the position determined in operation 710. For example, when the user presses the tactile feedback providing unit 210 in a Z-axial direction, a distance moved by the tactile feedback providing unit 210 may decrease equivalent to a magnitude of the force at which the user presses the tactile feedback providing unit 210.

In operation 730, the position measuring unit 220 may measure a position of the tactile feedback providing unit 210 having moved in operation 720.

In operation 740, the movement controlling unit 230 may verify whether the position of the tactile feedback providing unit 210 measured in operation 730 is identical to the position determined in operation 710. When the position of the tactile feedback providing unit 210 measured in operation 730 differs from the position determined in operation 710, the movement controlling unit 230 may perform operation 720 again. In this instance, the movement controlling unit 230 may move the tactile feedback providing unit 210 in a horizontal direction, from the position of the tactile feedback providing unit 210 measured in operation 730 to the position determined in operation 710.

When it is determined that the position of the tactile feedback providing unit 210 measured in operation 730 is identical to the position determined in operation 710, the movement controlling unit 230 may move the tactile feedback providing unit 210 in a vertical direction, to a vertical position determined in operation 710.

In operation 760, the tactile feedback providing unit 210 having moved in the vertical direction in operation 750 may provide the tactile feedback to the user.

In this instance, the tactile feedback providing unit 210 may change a shape of a portion to be in contact with a user, depending on types of tactile feedback to be provided to the user, as described with reference to FIG. 6.

The 3-D tactile feedback apparatus and method for controlling the same according to the above-described example embodiments may use one or more processors, which may include a microprocessor, central processing unit (CPU), digital signal processor (DSP), or application-specific integrated circuit (ASIC), as well as portions or combinations of these and other processing devices.

The units or modules described herein may be implemented using hardware components and software components. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Each block of the flowchart illustrations may represent a unit, module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three-dimensional (3D) tactile feedback apparatus, comprising:
    a tactile feedback providing unit to provide a 3D tactile feedback in response to a motion input;
    a position measuring unit to measure a position of the tactile feedback providing unit; and
    a movement controlling unit to control a movement of the tactile feedback providing unit, based on the position of the tactile feedback providing unit,
    wherein the tactile feedback providing unit includes at least one sensor disposed on a surface of the tactile feedback providing unit.

2. The apparatus of claim 1, wherein the movement controlling unit controls the movement of the tactile feedback providing unit independently in an X-axial direction and in a Y-axial direction, the X-axial direction and the Y-axial direction constituting a horizontal direction.

3. The apparatus of claim 1, wherein the position measuring unit measures a horizontal position of the tactile feedback providing unit, by sensing the tactile feedback providing unit using at least one sensor disposed adjacent to a bottom surface of the tactile feedback providing unit.

4. The apparatus of claim 3, wherein the position measuring unit measures the horizontal position of the tactile feedback providing unit, based on a position of at least one sensor sensing the tactile feedback providing unit, among the at least one sensor.

5. The apparatus of claim 1, wherein the movement controlling unit comprises:
    a first moving unit to move the tactile feedback providing unit in an X-axial direction; and
    a second moving unit to move the first moving unit in a Y-axial direction.

6. The apparatus of claim 5, wherein the position measuring unit receives the position of the tactile feedback providing unit from at least one first sensor connected to the first moving unit, and determines the received position of the tactile feedback providing unit to be an X-axial coordinate of the tactile feedback providing unit.

7. The apparatus of claim 5, wherein the position measuring unit receives a position of the first moving unit from at least one second sensor connected to the second moving unit, and determines the received position of the first moving unit to be a Y-axial coordinate of the tactile feedback providing unit.

8. The apparatus of claim 1, wherein the movement controlling unit determines a position to which the tactile feedback providing unit is to be moved, based on the motion input, and controls the movement of the tactile feedback providing unit to move the tactile feedback providing unit to the determined position.

9. The apparatus of claim 1, wherein the movement controlling unit controls the tactile feedback providing unit in a Z-axial direction corresponding to a vertical direction when a horizontal movement of the tactile feedback providing unit is determined.

10. A three-dimensional (3D) tactile feedback apparatus. comprising:
    a tactile feedback providing unit to provide a 3D tactile feedback in response to a motion input;
    a position measuring unit to measure a position of the tactile feedback providing unit; and
    a movement controlling unit to control a movement of the tactile feedback providing unit, based on the position of the tactile feedback providing unit,
    wherein the position measuring unit measures a horizontal position of the tactile feedback providing unit by sensing the tactile feedback providing unit using at least one sensor disposed adjacent to a bottom surface of the tactile feedback providing unit, and
    the position measuring unit measures the horizontal position of the tactile feedback providing unit, based on an area of the tactile feedback providing unit sensed by each of a plurality of sensors, when the tactile feedback providing unit is sensed by the plurality of sensors.

11. A three-dimensional (3D) tactile feedback apparatus. comprising:
    a tactile feedback providing unit to provide a 3D tactile feedback in response to a motion input;
    a position measuring unit to measure a postion of the tactile feedback providing unit; and
    a movement controlling unit to control a movement of the tactile feedback providing unit, based on the position of the tactile feedback providing unit,
    wherein the position measuring unit measures a horizontal position of the tactile feedback providing unit, using at least one sensor connected to a side surface of the tactile feedback providing unit and at least one sensor connected to an inner side surface of the movement controlling unit.

12. A three-dimensional (3D) tactile feedback apparatus, comprising:
    a tactile feedback providing unit to provide a 3D tactile feedback in response to a motion input;
    a position measuring unit to measure a position of the tactile feedback providing unit; and
    a movement controlling unit o control a movement of he tactile feedback providing unit, based on the position of the tactile feedback providing unit,
    wherein the tactile feedback providing unit changes a shape of a portion in contact with a user, depending on a type of tactile feedback to be provided to the user.

13. A three-dimensional (3D) tactile feedback apparatus method, comprising:
    measuring a position of a tactile feedback providing unit that provides a 3D tactile feedback, in response to a motion input; and
    controlling a movement of the tactile feedback providing unit, based on the position of the tactile feedback providing unit and by using at least one sensor disposed on a surface of the tactile feedback providing unit.

14. The method of claim 13, wherein the controlling comprises controlling the movement of the tactile feedback providing unit independently in an X-axial direction and in a Y-axial direction, the X-axial direction and the Y-axial direction constituting a horizontal direction.

15. The method of claim 13, wherein the measuring comprises measuring a horizontal position of the tactile feedback providing unit, by sensing the tactile feedback providing unit using at least one sensor disposed adjacent to a bottom surface of the tactile feedback providing unit.

16. The method of claim 15, wherein the measuring comprises measuring the horizontal position of the tactile feedback providing unit, based on a position of at least one sensor sensing the tactile feedback providing unit, among the at least one sensor.

17. The method of claim 13, wherein the controlling comprises determining a position to which the tactile feedback providing unit is to be moved, based on the motion input, and controlling the movement of the tactile feedback providing unit to move the tactile feedback providing unit in the determined direction and to the determined position.

18. The method of claim 13, wherein the controlling comprises controlling the tactile feedback providing unit in a Z-axial direction corresponding to a vertical direction when a horizontal movement of the tactile feedback providing unit is determined.

19. A three-dimensional (3D) tactile feedback apparatus method, comprising:
  measuring a position of a tactile feedback providing unit that provides a 3D tactile feedback, in response to a motion input; and
  controlling a movement of the tactile feedback providing unit, based on the position of the tactile feedback providing unit,
  wherein the measuring comprises measuring a horizontal position of the tactile feedback providing unit by sensing the tactile feedback providing unit using at least one sensor disposed adjacent to a bottom surface of the tactile feedback providing unit, and
  the measuring comprises measuring the horizontal position of the tactile feedback providing unit, based on an area of the tactile feedback providing unit sensed by each of a plurality of sensors, when the tactile feedback providing unit is sensed by the plurality of sensors.

20. A non-transitory computer-readable medium comprising a program for instructing a computer to perform the method of claim 13.

21. A three-dimensional (3D) tactile feedback apparatus method, comprising:
  measuring a position of a tactile feedback providing unit that provides a 3D tactile feedback, in response to a motion input;
  controlling a movement of the tactile feedback providing unit, based on the position of the tactile feedback providing unit; and
  changing a shape of a portion in contact with a user, depending on types of tactile feedback to be provided to the user.

22. A three-dimensional (3D) tactile feedback apparatus, comprising:
  a tactile feedback providing unit to provide a 3D tactile feedback in response to a motion input;
  a movement controlling unit to control a movement of the tactile feedback providing unit, based on a position of the tactile feedback providing unit;
  at least one first sensor connected to a surface of the tactile feedback providing unit; and
  at least one second sensor connected to a surface of the movement controlling unit,
  wherein at least one of the at least one first sensor and the at least one second sensor sense an area and position of the other to determine the position of the tactile feedback providing unit.

23. The apparatus of claim 22, wherein the at least one first sensor is connected to a bottom surface of the tactile feedback providing unit, the at least one second sensor includes at least third and fourth sensors connected to a top internal surface of the movement controlling unit, and the at least third and fourth sensors sense different respective areas of the first sensor to determine the position of the tactile feedback providing unit.

24. The apparatus of claim 23, wherein the 3D tactile feedback apparatus further comprises:
  a position measuring unit to measure a position of the tactile feedback providing unit; and
  at least one actuator connected to a side surface of the movement controlling unit to move the tactile feedback providing unit in a horizontal direction,
  wherein when the at least one actuator expands in a first horizontal direction, the position measuring unit measures the position of the tactile feedback providing unit by matching a first side of the tactile feedback providing unit to a first side of the at least one first sensor sensed by the third sensor, and by matching a second side of the tactile feedback providing unit to a second side of the at least one first sensor sensed by the fourth sensor.

25. The apparatus of claim 22, wherein the movement controlling unit includes a first moving unit enclosing the tactile feedback providing unit and a second moving unit enclosing the first moving unit,
  wherein the at least one first sensor is connected to a side surface of the tactile feedback providing unit, the at least one second sensor is connected to an internal side surface of the first moving unit, and the at least one second sensor senses the first sensor and sets a position of the first sensor to a position of the tactile feedback providing unit.

26. The apparatus of claim 25, wherein a third sensor is connected to an internal side of the second moving unit and a fourth sensor is connected to an external side surface of the first moving unit,
  wherein the third sensor senses the fourth sensor and sets a position of the fourth sensor to a position of the first moving unit.

* * * * *